UNITED STATES PATENT OFFICE 2,468,015

CYANOETHYL-SUBSTITUTED 1,3,5-TRI-METHYLENE TRISULFONES

Harry Thurston Hookway, Croydon, and Edward Michael Evans, Tonbridge, Kent, England, assignors to British Resin Products Limited, London, England, a British company No Drawing. Application August 26, 1947, Serial No. 770,759. In Great Britain September 19, 1946

14 Claims. (Cl. 260—327)

This invention relates to the formation of cyanoethyl derivatives of 1,3,5-trimethylene trisulphone, which, after hydrolysis, may be used as intermediates for the production of synthetic resinous materials. The structural formula of 1,3,5-trimethylene trisulphone is:

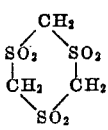

According to the present invention, there is provided a process for the production of cyanoethyl derivatives of 1,3,5-trimethylene trisulphone which comprises reacting acrylonitrile with 1,3,5-trimethylene trisulphone in the liquid phase and in the presence of a base. The base is preferably the hydroxide or carbonate of an alkali metal or alkaline earth metal or a quaternary alkyl ammonium hydroxide and the reaction may be carried out in an aqueous medium.

The products, which may be mono- or polysubstituted derivatives of 1,3,5-trimethylene trisulphone or mixtures of mono- and poly-substituted derivatives thereof, according to the proportions of acrylonitrile and trimethylene trisulphone used, may be prepared by reacting the said trimethylene trisulphone, conveniently in aqueous alkaline solution at a temperature between 0° C. and 5° C., with acrylonitrile for a period of time which may extend up to several hours.

The reaction products may be recovered from the reaction mixture by filtration of the reaction mixture and they may be crystallised from any suitable solvent, conveniently acetic acid or acetone.

By analogy with other known reactions of acrylonitrile with compounds containing groupings capable of reaction with acrylonitrile, it is assumed that the said reaction products are β-cyanoethyl derivatives of 1,3,5-trimethylene trisulphone.

The following examples, in which the parts are expressed by weight, illustrate the manner in which the invention may be carried into effect:

*Example 1.*—14 parts of 1,3,5-trimethylene trisulphone (prepared in known manner from symmetrical trithiane) were dissolved in 25 parts of water containing 2.8 parts of sodium hydroxide and the whole cooled to 0° C. 12 parts of acrylonitrile were then added over a period of 1.5 hours in small aliquot portions, the temperature being kept below 5° C. When all the acrylonitrile had been added the reaction mixture was allowed to stand for a further 12 hours and the sandy precipitate filtered off and dried under reduced pressure at 30° C. The product was predominantly a mixture of cyanoethyl derivatives of trimethylene trisulphone.

*Example 2.*—2 parts of trimethylene trisulphone were dissolved in 25 parts of water containing 1.13 parts of tetra-methyl ammonium hydroxide and the solution was cooled to 0° C. 0.5 part of acrylonitrile were added slowly with shaking, while the temperature of the mixture was kept below 5° C. When all the acrylonitrile had been added, the mixture was allowed to stand for a further 2 hours when the white precipitate was filtered off and dried. The product is believed to consist mainly of the mono β-cyanoethyl derivative of trimethylene trisulphone.

We claim:

1. A process for the production of cyanoethyl derivatives of 1,3,5-trimethylene trisulphone which comprises reacting acrylonitrile with 1,3,5-trimethylene trisulphone in the liquid phase and in the presence of a base.

2. A process as set forth in claim 1, wherein said base is an alkali metal hydroxide.

3. A process for the production of cyanoethyl derivatives of 1,3,5-trimethylene trisulphone which comprises reacting acrylonitrile with 1,3,5-trimethylene trisulphone in an aqueous medium and in the presence of a base.

4. A process as set forth in claim 3, wherein said base is an alkali metal hydroxide.

5. A process for the production of cyanoethyl derivatives of 1,3,5-trimethylene trisulphone which comprises reacting acrylonitrile with 1,3,5-trimethylene trisulphone at a temperature between 0° C. and 5° C. in the liquid phase and in the presence of a base.

6. A process as set forth in claim 5, wherein said base is an alkali metal hydroxide.

7. A process for the production of cyanoethyl derivatives of 1,3,5-trimethylene trisulphone which comprises reacting acrylonitrile with 1,3,5-trimethylene trisulphone at a temperature between 0° C. and 5° C. in an aqueous medium and in the presence of a base.

8. A process as set forth in claim 7, wherein said base is an alkali metal hydroxide.

9. A process for the production of cyanoethyl derivatives of 1,3,5-trimethylene trisulphone which comprises reacting acrylonitrile with 1,3,5-trimethylene trisulphone in the liquid phase and in the presence of a base and thereafter separating from the reaction mixture and recrystallising the resulting cyanoethyl derivative.

10. A process for the production of cyanoethyl derivatives of 1,3,5-trimethylene trisulphone which comprises reacting acrylonitrile with 1,3,5-trimethylene trisulphone in the liquid phase and in the presence of a base and thereafter separating from the reaction mixture and recrystallising the resulting cyanoethyl derivative from acetic acid.

11. A process for the production of cyanoethyl derivatives of 1,3,5-trimethylene trisulphone which comprises reacting acrylonitrile with 1,3,5-trimethylene trisulphone in the liquid phase and in the presence of a base and thereafter separating from the reaction mixture and recrystallising the resulting cyanoethyl derivative from acetone.

12. A process for the production of cyanoethyl derivatives of 1,3,5-trimethylene trisulphone which comprises adding acrylonitrile to an aqueous solution of sodium hydroxide containing 1,3,5-trimethylene trisulphone while maintaining the temperature below 5° C. and subsequently separating from the reaction mixture the precipitate so formed.

13. A process for the production of cyanoethyl derivatives of 1,3,5-trimethylene trisulphone which comprises adding acrylonitrile to an aqueous solution of tetramethyl ammonium hydroxide containing 1,3,5-trimethylene trisulphone while maintaining the temperature below 5° C. and subsequently separating from the reaction mixture the precipitate so formed.

14. A mixture containing at least two compounds selected from the group consisting of the mono-, di-, and tri-cyanoethyl-substituted 1,3,5-trimethylene trisulphones.

HARRY THURSTON HOOKWAY.
EDWARD MICHAEL EVANS.

No references cited.